(12) United States Patent
Schäffer et al.

(10) Patent No.: US 9,942,510 B2
(45) Date of Patent: Apr. 10, 2018

(54) METHOD AND DEVICE FOR PROCESSING INPUT IMAGE DATA

(71) Applicant: SMR Patents S.A.R.L., Luxembourg (LU)

(72) Inventors: Heinz-Erwin Schäffer, Kornwestheim (DE); Oleg Konevsky, Remseck am Neckar (DE)

(73) Assignee: SMR Patents S.A.R.L., Luxembourg (LU)

( * ) Notice: Subject to any disclaimer, the term of this patent is extended or adjusted under 35 U.S.C. 154(b) by 200 days.

(21) Appl. No.: 14/891,548

(22) PCT Filed: May 13, 2014

(86) PCT No.: PCT/EP2014/059788
§ 371 (c)(1),
(2) Date: Nov. 16, 2015

(87) PCT Pub. No.: WO2014/184202
PCT Pub. Date: Nov. 20, 2014

(65) Prior Publication Data
US 2016/0105630 A1    Apr. 14, 2016

(30) Foreign Application Priority Data

May 16, 2013 (EP) ..................................... 13168085

(51) Int. Cl.
G06K 9/00 (2006.01)
H04N 5/765 (2006.01)
G06T 3/00 (2006.01)

(52) U.S. Cl.
CPC ........... *H04N 5/765* (2013.01); *G06T 3/0093* (2013.01)

(58) Field of Classification Search
CPC .............................. H04N 5/765; G06T 3/0093
See application file for complete search history.

(56) References Cited

U.S. PATENT DOCUMENTS

| 5,204,944 A | 4/1993 | Wolberg et al. |
| 5,208,872 A | 5/1993 | Fisher |

(Continued)

FOREIGN PATENT DOCUMENTS

| EP | 2804144 A1 | 11/2014 |
| WO | 2006128862 A1 | 12/2006 |

OTHER PUBLICATIONS

Weinhaus et al., "Image Processing Algorithms and Techniques", SPIE—The International Society for Optical Engineering, 1990, vol. 1244, pp. 1-16.

(Continued)

*Primary Examiner* — John Strege
(74) *Attorney, Agent, or Firm* — MacMillan, Sobanski & Todd, LLC (57) ABSTRACT

The invention provides a method for processing input image data by an image processing device, to reach a desired visual effect within an output image, wherein input image data are stored within an input memory device and the input image data are transferred based on data of a lookup table into respective output image data stored within an output memory device, the lookup table being generated based on at least one data remapping function to reach the desired visual effect, wherein further the entries within the lookup table are arranged in such a way that when processing the lookup table the input memory device is addressed in a sequential reading order; a computer readable medium having stored thereon program code to carry out the inventive method as well as an image processing device to carry out the method.

25 Claims, 6 Drawing Sheets

(56) References Cited

U.S. PATENT DOCUMENTS

| | | | | |
|---|---|---|---|---|
| 5,463,702 | A * | 10/1995 | Trueblood | G06T 9/00 348/391.1 |
| 6,992,783 | B1 * | 1/2006 | Sumiuchi | G06T 11/001 358/1.15 |
| 7,336,299 | B2 | 2/2008 | Kostrzewski et al. | |
| 2007/0041659 | A1 * | 2/2007 | Nobori | B60R 1/00 382/284 |
| 2007/0188633 | A1 * | 8/2007 | Mandy | G06T 3/0018 348/241 |
| 2009/0013136 | A1 * | 1/2009 | Chi | H03M 13/2764 711/157 |
| 2009/0179773 | A1 | 7/2009 | Denny et al. | |
| 2011/0083183 | A1 * | 4/2011 | Freeman | G06F 21/566 726/24 |
| 2013/0297855 | A1 * | 11/2013 | Gupta | G06F 3/0656 711/103 |
| 2014/0164722 | A1 * | 6/2014 | Garthwaite | G06F 12/16 711/162 |

OTHER PUBLICATIONS

PCT International Search Report and the Written Opinion, Application No. PCT/EP2014/059788 filed May 13, 2014, dated Jul. 24, 2014.

PCT International Preliminary Report on Patentability, Application No. PCT/EP2014/059788 filed May 13, 2014, dated Jul. 30, 2015.

\* cited by examiner

METHOD AND DEVICE FOR PROCESSING INPUT IMAGE DATA

CROSS-REFERENCE TO RELATED APPLICATIONS

This application is the National Phase of International Application PCT/EF2014/059788 filed May 13, 2014 which designated the U.S. and that International Application was published in English under PCT Article 21(2) on Nov. 20, 2014 as International Publication Number WO 2014/184202A1. PCT/EF2014/059788 claims priority to European Patent Application No. EP13168085.2, filed May 16, 2013. The disclosures of both applications are incorporated herein by reference.

The invention relates to a method for processing input image data by an image processing device, to achieve a desired visual effect within the output image, wherein input image data are stored within an input memory device and the input image data are transferred based on data of a lookup table into respective output image data stored within an output memory device, the lookup table being generated based on at least one data remapping function.

Figure 1:
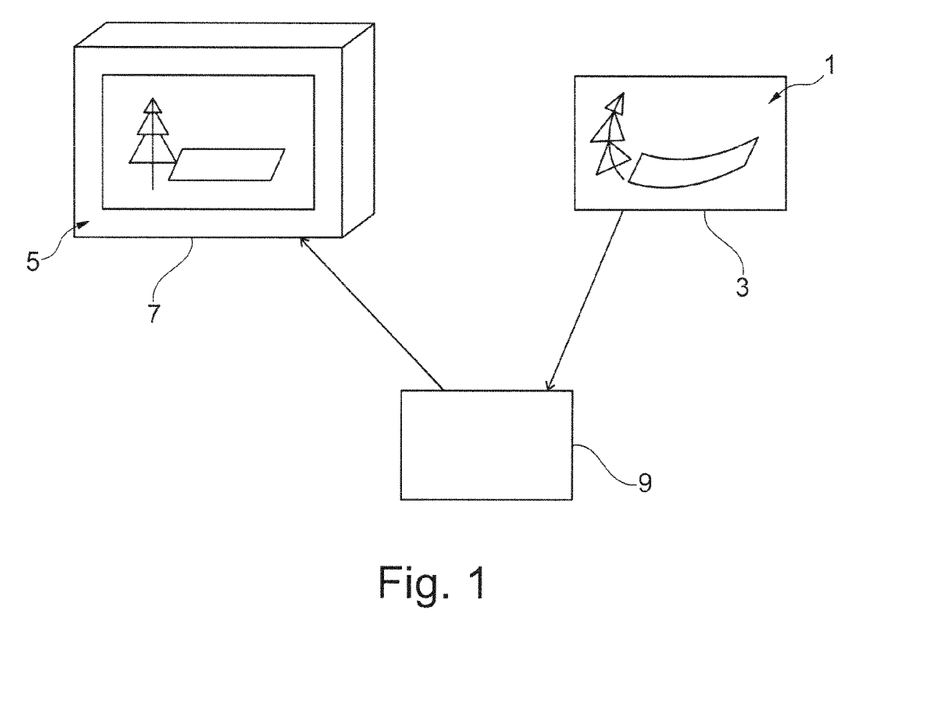
FIG. 1: describes the general process of an imaging processing.

Many camera based applications, for example automotive parking assistance, require image transformation in order to achieve a desired visual effect, for example to correct image distortion caused by the lens. As shown in FIG. 1, an input image 1 captured by a sensor 3, might display unwanted distortion caused by a lens. To allow visualizing of an output image 5 without distortion on a display 7, data of the input image 1 are processed by an image processing device 9.

Another example of such a visual effect is called "Bird View". The image displayed to the driver looks as if it were taken from above the vehicle with the camera facing downwards.

In both examples above, desired visual effect is achieved by repositioning the pixels of the image obtained from the sensor (input image) thus forming output image, which is displayed to the driver.

Such generic methods for image processing are for example known from US 2009/0179773 A1 and U.S. Pat. No. 7,336,299 B2.

Due to the discrete nature of both input and output images, more than one pixel value from the input image can be required to form a single pixel of the output image. For example, as shown in the FIG. 2, one output image pixel 11 is mapped between the four pixels 13 of the input image. In this case, at least one characteristic value of the output image pixel 11 is calculated by interpolating corresponding characteristic values of the surrounding input image pixels 13.

Figure 2:
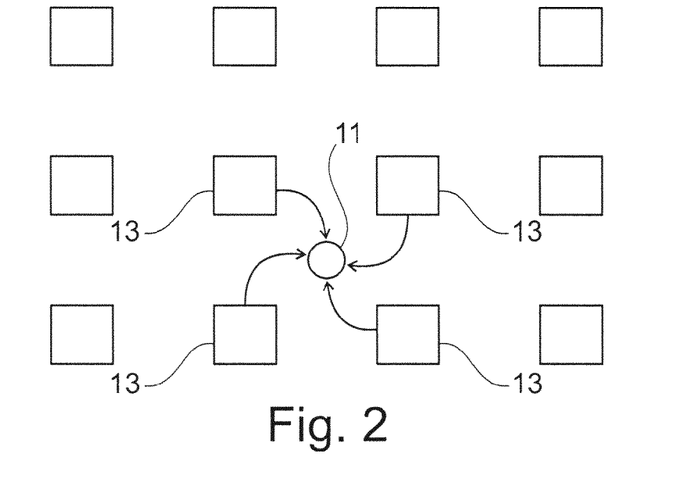
FIG. 2 describes the general idea of bilinear interpolation.

One can use bilinear interpolation that involves four input image pixels 13 to calculate one output pixel 11. Also linear interpolation (data of two input pixels are used per single output pixel) or nearest neighbor interpolation (data of one input pixel is used per single output pixel) might be used. However, these two last mentioned approaches are usually associated with a significant loss of image quality, and therefore avoided whenever possible.

In order to obtain smooth motion on the display, the video stream consisting of the sequence of images must be processed in real time, i.e. the processing time for one image (frame) must not exceed the time between the two consequent frames output by the sensor. For example, if the sensor operates at the industry standard frame rate of 30 frames per second, the maximum time allowed for processing of a single frame is 33.3 ms.

Figure 3:
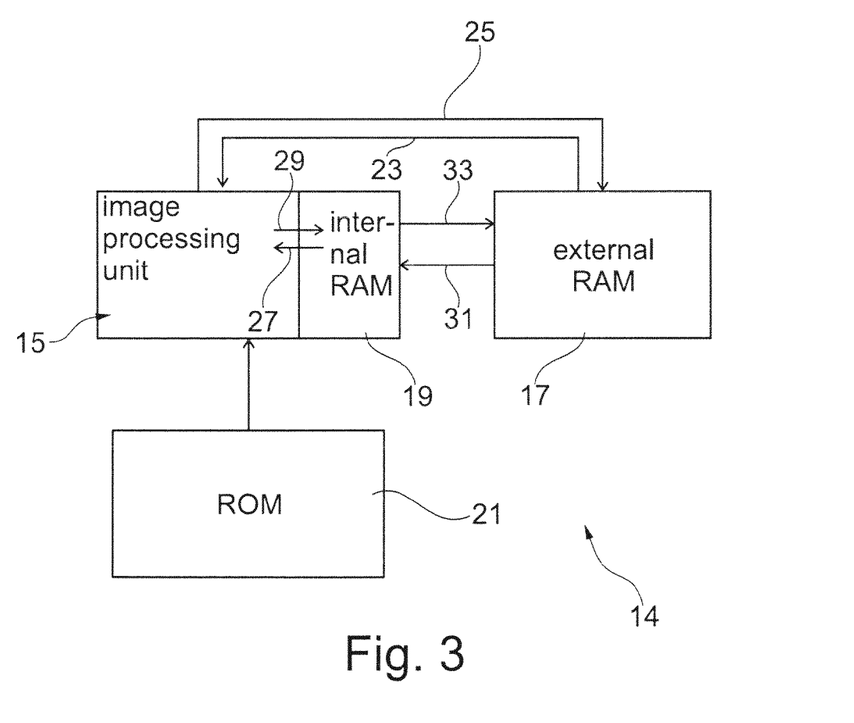
FIG. 3 shows schematically the general setup of an imaging processing device that can be used to carry out the inventive method.

An image processing device 14 capable of doing said processing might have a general setup as shown schematically in FIG. 3, that comprises at least an image processing unit 15, internal RAM (random-access memory) device 19, external RAM device 17, and ROM (read-only memory, nonvolatile memory) device 21.

The ROM device 21 contains the program code executed by the image processing unit 15, as well as some data required to perform said processing. The content of the ROM device 21 does not change during normal operation of the image processing device 14.

External RAM device 17 contains at least two buffers: one to store input image data (input buffer), and another to store output image data (output buffer). Both input and output buffers are arranged in a pixel order, i.e. in such a way, that adjacent pixels in the same row of the image occupy adjacent cells of the buffer, and the last pixel of one image row is immediately followed by the first pixel of the next image row. Thus to read out the image data "pixel by pixel" the memory is addressed in a "cell by following cell" order, i.e. a first cell is read followed by a an adjacent, neighboring second cell, followed by a third cell adjacent to the second cell opposite the first cell and so on.

The image processing unit 15 remaps the pixels of the input image contained in the input buffer to the pixels of the output image in the output buffer in such a way that the desired visual effect is achieved; in particular a distortion caused by a lens is reduced or eliminated. The image processing unit 15 can be implemented for example as a digital signal processor (DSP), a field programmable gate array (FPGA), or an application specific integrated circuit (ASIC).

The external RAM device 17 represents an external storage device and internal RAM device 19 represents an internal storage device.

The external RAM device 17, for example DDR2 SDRAM (double data rate synchronous dynamic random-access memory), might be implemented as a separate integrated circuit, i.e. might be physically separated from the image processing unit 15. The external RAM device 17 has sufficient capacity to accommodate the input and output buffers. However read operations 23 and write operations 25 between external RAM device 19 and image processing unit 15 cause stalls of the latter, because external RAM device 17 is typically clocked at significantly lower frequency.

An internal RAM device 19 might be implemented on the same integrated circuit as the image processing unit 15. Therefore, internal RAM device 19 operates at the same clock frequency as the image processing unit 15. This allows performing read operations 27/write operations 29 sufficiently fast to avoid stalls of the image processing unit 15, or at least, reduce their duration in comparison to external RAM device 17.

In order to reduce the number of accesses of external RAM device 17, internal RAM device 19 can be used as an addressable cache, and in this case, it is managed by a cache controller. The main idea behind the cache is that whenever some address, i.e. a respective memory cell is accessed by a read operation 31 in the external RAM device 17, an entire block of data containing the desired memory cell is fetched into internal RAM device 19. If the same address/cell or any other address/cell in the same block is accessed again, data in the internal RAM device 19 is reused, thus avoiding access to the external RAM device 17. This technique minimizes stalls of the image processing unit 15, if assumption about temporal and spatial locality of the data holds, which is often the case in the image processing.

Also write operations to the external RAM device 17 can be carried out such that not only a single cell but a complete block is transferred from the internal RAM device 19 to the external RAM device 17 by a write operation 33.

Detailed explanation about the addressable cache operation can be found in [TMS320C64x+DSP Cache User's Guide, Literature Number: SPRU862B]

Usually, external memory RAM blocks can be configured as cacheable or non-cacheable. For distortion correction and other applications involving pixels repositioning, the output buffer is placed in the non-cacheable external RAM. As long as output buffer is accessed exactly once per pixel within the same frame, using cache brings no advantages. On the other hand, the input buffer is located in the cacheable external RAM, because each element of the input buffer is likely to be accessed multiple times, as the same value can be involved into interpolation at several locations. In this case, cache can boost the system performance by reusing the data in the internal memory and thus avoiding processor stalls associated with the external memory access.

A mapping function required to achieve a targeted visual effect, i.e. correspondence between the locations of input and output image, is used and usually represented in the form of a lookup table (LUT). A LUT contains one entry per pixel of the output image. Every entry n of the LUT preferably contains the following fields:
1. An input memory address (InAddr) field to identify a memory address in the input buffer LUT [n].InAddr
2. A horizontal interpolation coefficient LUT[n].$C_H$
3. A vertical interpolation coefficient LUT[n].$C_V$ The LUT can be calculated before the image processing starts and stored in the non-cacheable external RAM, or alternatively, might be pre-calculated externally with respect to the image processing device and stored in the ROM. The following method can be employed to calculate LUT:

```
1. for all y from 0 to Height-1 do
   1.1. for all x from 0 to Width-1 do
      1.1.1. x_i = f_1(x, y)
      1.1.2. y_i = f_2(x, y)
      1.1.3. n = y * width + x
      1.1.4. LUT[n]. InAddr = floor(y_i) * width + floor(x_i)
      1.1.5. LUT[n].C_V = y_i - floor(y_i)
      1.1.6. LUT[n].C_H = x_i - floor(x_i)
   1.2. end
2. end
```

Where:
y—is a row position;
x—is a column position;
Width—is the width (number of columns) of the input/output image;
Height—is the height (number of rows) of the input/output image;
$x_i$, $y_i$—are transformation values;
n—is a position value;
$f_{1,2}$ $(\alpha,\beta)$—are remapping functions, i.e. functions describing a transformation of the pixel coordinates $\alpha$, $\beta$ required to perform a visual effect, for example an un-distortion;
floor($\gamma$)—is a function returning as the floor value the larger integer not greater than the argument $\gamma$.

A typical pixel remapping method used to correct lens distortion is described below:
1. For every element n of the output buffer, where n runs from 0 to N-1 do
   1.1. InAddr=LUT[n].InAddr
   1.2. $C_H$=LUT[n].$C_H$
   1.3. $P_1$=I[InAddr]+CH*(I[InAddr+1]-I[InAddr])
   1.4. $P_2$=I[InAddr+Width]+CH*(I[InAddr+Width+1]-I[InAddr+Width])
   1.5. $C_V$=LUT[n].$C_V$
   1.6. O[n]=$P_1$+CV*($P_2$-$P_1$)
2. end
Where:
I[n]—is the n-th element of input buffer;
O[n]—the n-th element of the output buffer;
N—total number of pixels in the input/output image.

This known method has however the drawback that accessing the input image data stored in the input memory device leads to stalls of the imaging processing unit although the internal RAM is used as a cache.

There is a demand for a method that allows image processing, such as image transformation for distortion correction, to be performed in a real time without the necessity to change a hardware component, for example to increase an internal memory size and/or a clock frequency of an external RAM, while maintaining high quality of the displayed image by using bilinear interpolation. It is thus an objective of the invention to further develop the image processing method known in the state of the art to allow a fast, high quality, real time imaging processing.

This objective is achieved by arranging the entries within the lookup table in such a way that when processing the lookup table the input memory device is addressed in a sequential reading order. The processing of the lookup table means, especially that the table is read "entry by entry" to reach the remapping of the input picture data into the output picture data. Especially at least two pixels of the input image, preferably a plurality of pixels, of the input image are read and processed to calculate one single output image pixel. A sequential reading order means especially that the input memory device is addressed such that a cell located before a following or subsequent cell in the memory is read timely before the subsequent cell, especially that it is addressed cell by adjacent cell. The addressing might include also skipping single or plurality cells or that at least all cells within a specified cell group or cell block necessary for the remapping are addressed (however not necessarily cell by cell within the group) before a cell in an adjacent cell group is addressed. The cell group might be formed by the cells loadable into the internal storage device and/or cache as explained in the following.

Especially, as explained later in detail, the entries within the lookup table might be arranged in such a way that the input image data in the external RAM are addressed in a pixel order.

An inventive method might be characterized in that the entries within the lookup table are arranged before the transfer of the input image data into the output image data and/or in that as desired visual effect a correction of lens distortion effect and/or the generating of a bird view is/are achieved.

The invention furthermore proposes that the input memory device comprises at least one input buffer, especially for storing the input image data, and/or the output memory comprises at least one output buffer for storing the output image data.

Advantageous embodiments of the invention might be characterized in that the lookup table is generated as a list, having a plurality of entries, each comprising for a respective pixel at least one position value, a least one input memory address field (LUT[n].InAddr) representing a memory address in the input memory device and/or the input buffer, at least one horizontal interpolation coefficient (LUT[n].Ch) and at least one vertical interpolation coefficient (LUT[n].Cv), is provided.

In the before described embodiment it is especially preferred that to generate the lookup table for each pixel of the input image the position value is calculated based on a row position and a column position of the pixel in the input image, especially by adding to the column position the product of the row position multiplied with the number of columns of the input image, and/or respective value of the input memory address field (LUT[n].InAddr), the horizontal interpolation coefficient (LUT[n].Ch) and the vertical interpolation coefficient (LUT[n].Cv) is calculated based on the data remapping function, preferably describing a transformation of pixel coordinates (x, y) required to perform the visual effect.

Furthermore it is proposed that to generate the lookup table for each pixel of the input image at least one transformation value is calculated based on the data remapping function, especially at least one first transformation value based on a first data remapping function and at least one second transformation value based on a second data remapping function, wherein preferably the respective value of the input memory address field (LUT[n].InAddr) is calculated by adding to the floor value of the first transformation value (floor(xi)) the product of the floor value of the second transformation value (floor(yi)) multiplied with the number of columns (width) of the input image, the horizontal interpolation coefficient (LUT[n].Ch) is calculated by subtracting from the first transformation value (xi) the floor value of the first transformation value, and/or the vertical interpolation coefficient (LUT[n].Cv) is calculated by subtracting from the second transformation value the floor value of the second transformation value(floor(yi)).

An inventive method might be furthermore characterized in that after generating the lookup table and/or before the transfer of the input image data into the output image data the entries within the lookup table are rearranged based on a sort function, wherein the sort function preferably comprises at least one bubble sort function, at least one quick sort function, at least one merge sort function, at least one insertion sort function, at least one tree sort function, at least one comb sort function, at least one gnome sort function, at least one heap sort function, at least one intro sort function, at least one selection sort function, at least one shaker sort function, at least one shell sort function, at least one smooth sort function, at least one stooge sort function, at least one swap sort function, at least one bucket sort function, at least one counting sort function and/or at least one radix sort function.

It is also preferred that to rearrange the entries of the lookup table such that the entries are sorted in a ascending or descending order of the input memory address field (LUT[n].InAddr) of the entries.

The invention might be furthermore characterized in that the input image data are stored in the input memory device and/or the output image data are stored in the output memory device in a pixel order, especially data of adjacent pixels in a row of the input image are stored in adjacent cells of the input memory device and data of a pixel at an end of a row of the input image are stored in a cell of the input memory device followed by a cell in which the data of a pixel of a following row of the input image are stored and/or data of adjacent pixels in a row of the output image are stored in adjacent cells of the output memory device and data of a pixel at an end of a row of the output image are stored in a cell of the output memory device followed by a cell in which the data of a pixel of a following row of the output image are stored.

It is furthermore proposed that for the transfer of the data the entries in the lookup table are processed in a sequential processing, especially reading, order and when following this sequential processing order the input memory device, especially the cells of the input memory device, is/are addressed in a sequential reading order.

Furthermore an inventive method might be characterized in that the transfer of the data comprises reading a first entry in the lookup table comprising information on the pixel to be read out of the input memory device, especially a first memory address in the input memory device, preferably the input memory address field (LUT[n].InAddr), and a second memory address in the output memory device, wherein especially the position value is used as an output memory address field (LUT[n].OutAddr), at least indirectly addressing a respective cell, especially identified by the first input memory, address in the input memory device, reading the input image data stored in said cell of the input memory device, addressing a respective cell, especially identified by the second memory address, in the output memory device and storing said read input image data based on the data stored in the lookup table in said cell in the output memory device.

Further advantageous embodiments might be characterized in that the input buffer and/or the output buffer are at least partly located within an external storage device, especially comprising a random-access memory and/or preferably located externally to and/or physically separated from an image processing unit, and/or when reading data out of a respective cell of the input buffer and/or the output buffer of the external storage device the data is copied into and/or cached in an internal storage device, especially in an input buffer and/or output buffer of the internal storage device, wherein the internal storage device preferably comprises a random-access memory and/or is located internally of the image processing unit, wherein especially data stored in neighboring cells of the respective cells are also copied into/cached as a block in the internal storage device.

In the before described embodiment it is especially preferred that read/write operations of the image processing unit are performed faster with the internal storage device than with the external storage device, especially stalls of the image processing unit is avoided or reduced when read/write operations of the image processing unit are performed with the internal storage device.

Also it is proposed that first the internal storage device is accessed to read the input image data for the transfer and in case the required data are not available/are not cached in the internal storage device, the external storage device, especially the input buffer, is accessed to read the data for the transfer.

For the inventive method it is also preferred that the lookup table is generated by the image processing unit or is generated by a processing unit being separated from the image processing unit and/or the lookup table is stored within a read-only memory connected to the image processing unit, especially also storing program code information executed by the image processing unit for processing the input image data.

Finally it is proposed for the claimed method that the data remapping function comprises a bilinear interpolation.

The invention furthermore provides a computer readable medium having stored thereon program code to carry out an inventive method.

In addition the invention provides a device image processing, comprising at least one image processing unit, at least one input memory device in which data of at least one input image are storable and at least one output memory device in which data of at least one output image are storable, wherein the image processing unit is configured to carry out an inventive method.

Finally it is proposed for the claimed device that the device comprises at least one image sensor, wherein the data provided by the image sensor are input into and/or stored in the input memory device.

Thus the claimed invention is based on the surprising finding that by a simple re-ordering of the data stored in the lookup table for an image transformation a fast real time imaging processing can be achieved. It was recognized by the inventors that the nature of wanted visual effects, for example lens distortion, makes pixels of the input image to be accessed in an order different from the pixel order in the image and thus different from the order of the data fields in the input memory device/input buffer. Due to the manufacturing constraints, power consumption and cost considerations, an internal RAM of an image processing device has usually the volume sufficient to accommodate only a few image rows. For example, typical up to date DSP features 128 kilobytes of internal RAM 19, which is just enough to store about 25 rows of an input image, assuming typical 1 MPix sensor (1280×800 pix) is used. As only a restricted block of data of the input buffer is stored in the internal RAM/cache it is not secured that all the data transferred into the cache is sufficient to process the stored input image data without the necessity to use image data not being transferred into the cache. It was realized that often the image processing unit has to access the slower, external RAM to retrieve input image data for the processing. The access of the external RAM however overwrites the data in the cache and leads to a stall of the imaging processing. Due to the limited cache capacity, obviously, the probability of reusing the data loaded into the cache on the previous iteration is reduced. That is, the assumption about special locality of the data does not hold. As long as the input buffer in the external storage device is accessed a plurality, especially four, times per single write to the output buffer to retrieve the necessary data for the calculation of an output image pixel data, this decreases the efficiency of the cache usage, and increases processing time. The inventors realized that this effect leads to the result, that in the worst case, the frame processing time exceeds the time slot allocated for that, and the system fails to perform the image processing in real time.

The extension of the internal RAM/cache would be cost consuming and is in most cases not possible due to the restriction of power consumption. Just by re-ordering the data stored in the lookup table the real-time image processing without changing parameters of hardware components, for example increasing a size of a cache or changing a clock frequency of an external RAM, or without reducing the quality of the imaging processing by not using bilinear interpolation can be achieved.

It was recognized that by a re-arrangement of the data stored in the lookup table the processing speed can be increased by avoiding the need to access an external storage device instead of using data that is already stored within an internal storage device/cache. With other words the lookup table is adapted to the data that are accessible within the internal storage device/cache. Especially the use of a position value always existing within an image processing lookup table as an identifier for an output memory address allows a reordering of the entries in the lookup table without negatively influencing the ability to address the correct location within the output image memory device. The claimed invention is thus based on the finding that the transformation of the input image data has to be aligned with the order of image data as stored in the input memory device in comparison to the method used in the state of the art where the imaging data processing is aligned with the order of the data stored in the output memory device in which the output image data are stored.

According to the present invention the entries of the lookup table are rearranged in such a way, that during the transformation process the input image data is accessed in a row order, i.e. in the same order, as the image rows are output by the sensor. Thus the image data in the input memory device are addressed cell by following cell or at least, cell group by following cell group. Doing this, allows each line of the input image to be loaded into the cache only once, thus minimizing the number of accesses of external storage device and minimizing associated image processing unit stalls.

Further features and advantages of the invention come apparent with the help the following description of preferred embodiments of the invention that are explained with the help of the enclosed figures in which.

Figure 4:
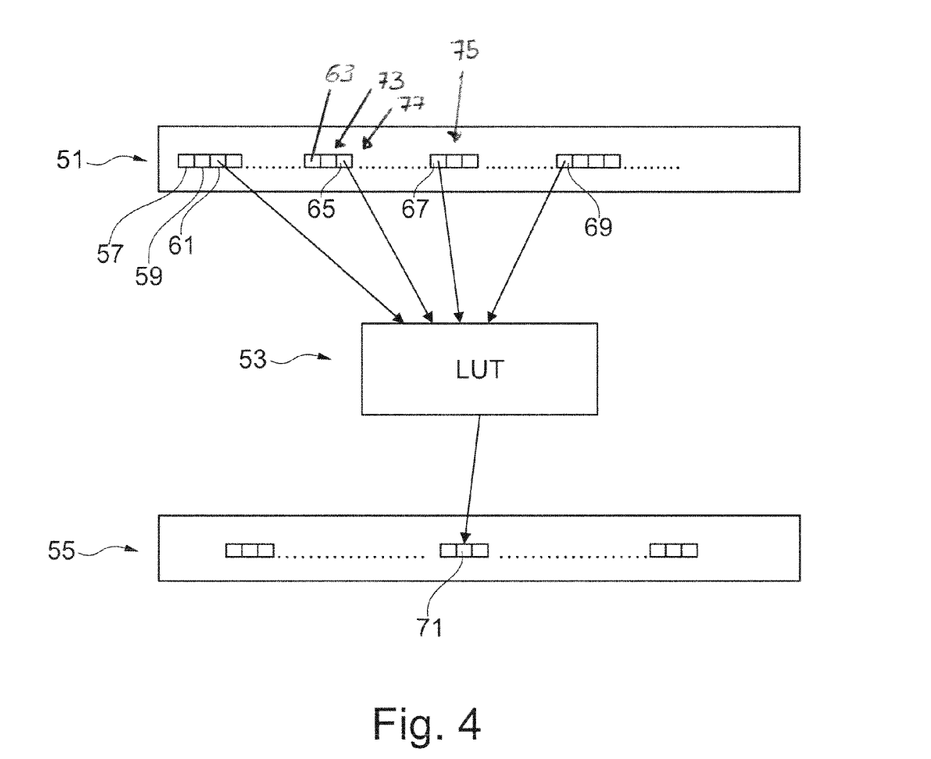
FIG. 4 visualizes the data access used in an imaging processing method according to the state of the art.

In FIG. 4 it is visualized how in an imaging processing method according to the state of the art the input image data, that are stored in an input buffer 51, are accessed to transform the image data via a lookup table 53 into an output image stored in an output buffer 53.

The input buffer 51 comprises a plurality of cells 57, 59, 61, 63, 65, 67, 69. In the input buffer 51 the input image data are stored in a pixel order. The input image has a width defined by the number of columns in the input image and a height defined by the number of rows in the input image. As the image data are stored in a pixel order, the data concerning the input image data of the first row are stored in the input buffer 51 such that the data of each pixel are stored in a cell (for example cell 57) followed by a cell (for example cell 59) in which the data of the pixel in the next column of the same row are stored and that a cell in which the data of the last pixel of one row are stored (for example cell 63) are followed by a cell (for example cell 65) in which the data of the pixels of a following row of the image are stored.

When processing the input image data by using the lookup table 53 in the method known from the state of the art the data stored in the input buffer are not accessed in the order how they are stored in the input buffer 51. As the output image stored in the output buffer 53 it is generated column by column in each row of the output image and row by row it is necessary to access data stored in different places within the input buffer 51 to calculate the respective data for the output image pixel. For example to calculate the data for an image pixel stored in cell 71 of the output buffer 55 the cells 63, 65, 67 and 69 have to be accessed. As the input buffer is cacheable when reading cell 63 out of the input buffer of the external storage device/external RAM all data stored in block 73 are transferred into the internal RAM/cache, especially the input buffer of the internal storage device/internal RAM. This allows to read cell 65 out of the cache without the need to re-access the (slower) external RAM.

However the cell 67 is not comprised by block 73 and thus is not read into the cache when reading cells 63, 65. Thus slower, external RAM has to be accessed and block 75 is transferred into the cache and block 73 is overwritten within the cache. This leads to a significant delay in the processing. As additionally also cell 69 has to be accessed and cell 69 is not comprised by block 75 again the external RAM has to be accessed instead of internal RAM/cache.

Thus for generating data for cell 71 in output buffer 55 the slower external RAM has to be accessed three times, leading to stalls during image processing. This situation might become more worse in case cell 65 would be a part of block 77 as after reading block 73 into the cache, for cell 63 block 77 would be read into the cache for cell 65, than block 75 would be read into cache for cell 67, however as block 77 would be overwritten by block 75 in the cache, block 77 would have to be read again into the cache for cell 69.

Thus pixels that are in the same row of the output image, are mapped through the lookup table 53 on the pixels of the input image that are located in the different rows, that means not in a sequential order within the input buffer 51. Especially a first cell being located before a second cell in the input buffer is read/addressed timely after the second cell.

According to the preferred embodiment of the present invention, a lookup table 83 (FIG. 6) includes a plurality of entries, each entry containing at least the following fields:
1. An input memory address field to identify a memory address in the input buffer (81) LUT[n].InAddr
2. An output memory address field to identify a memory address in the output buffer (85) LUT[n].OutAddr
3. A horizontal interpolation coefficient LUT[n].$C_H$
4. A vertical interpolation coefficient LUT[n].$C_V$ The field LUT[n].OutAddr corresponding to the particular element n also referred to as position value in the output buffer (85) contains the index of the given element, i.e. LUT[n].OutAddr=n.

Figure 6:
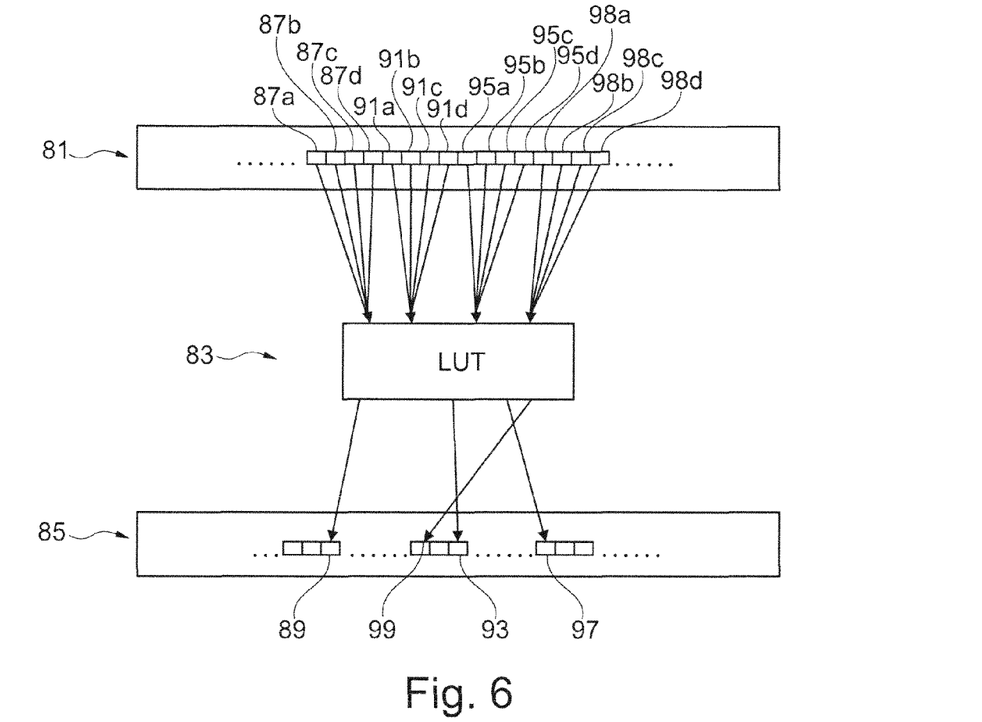
FIG. 6 visualizes the data access in the claimed method comparable to FIG. 4.

According to the invention, before the image processing the lookup table (83) entries are rearranged in a way that for every entry n from 0 to N−2 holds the equation:

LUT[$n$].InAddr≤LUT[$n$+1].In Addr.

That is, every next entry of the lookup table 83 refers to the higher or the same address in the input buffer 81 as the previous. Thus, it is guaranteed that the input buffer 81 is accessed in the pixel order cell order and every row is loaded into the internal storage device/cache no more than once during frame processing.

Figure 5:
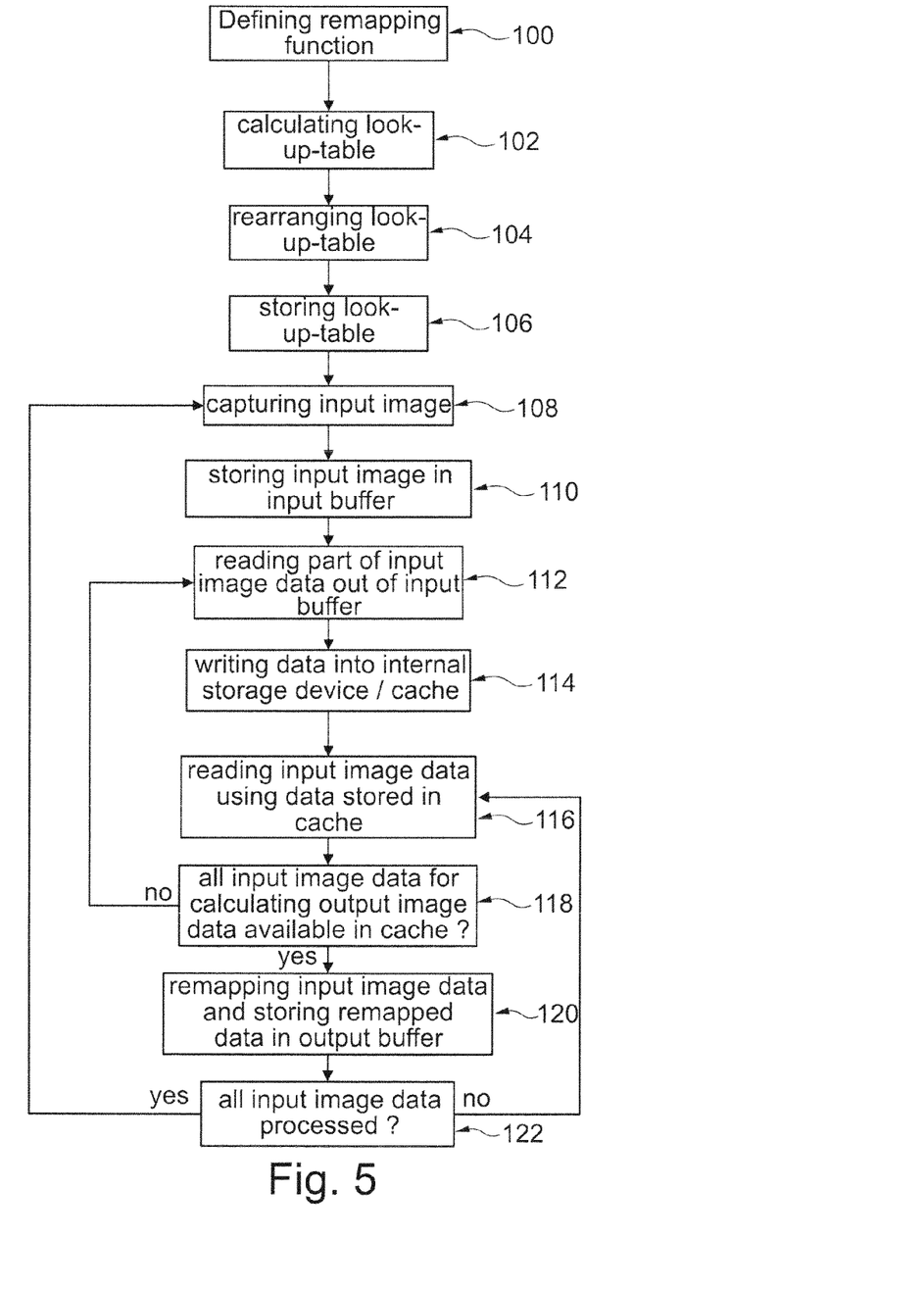
FIG. 5 is a flow diagram showing the steps of the inventive method.

In FIG. 5 a flow diagram of the inventive method usable with an image processing device as shown in FIG. 3 and described above is given. In a first step 100 a remapping function to reach a wanted visual effect is defined. Based on this remapping function in step 102 a lookup table 83 (see FIG. 6) is calculated. In step 104 the entries within the lookup table 83 are rearranged in the before described manner and in step 106 the lookup table 83 is stored. The lookup table 83 can be calculated and rearranged by the image processing device or image processing unit itself or might be build and rearranged externally with respect to the imaging processing device. For example the lookup table 83 might be generated on an external computer and the resulting lookup table 83 is stored in the ROM of the imaging processing device. For example it might be loaded during a boot-up phase of the imaging processing device and might be used during the imaging processing by the imaging processing unit.

An image processing is described in FIG. 5 in steps 108 to 122. In the step 108 the input image is captured. In a step 110 the input image data provided by the sensor/camera are stored in the input buffer 81. Than the image processing unit uses the lookup table 83 to transfer the input image data into the output image data. For this purpose the entries of the LUT are addressed one of another, ie. sequentially, and due to the rearrangement of the LUT the input buffer is accessed and this leads to the result that a part of the image data in form of a block of a plurality of cells are read out of the input buffer of the external storage device (step 112) and is written to the internal storage device/cache in step 114. For calculating the data of the respective cells in the output image the image processing unit accesses the internal storage device in the steps 116 to 120.

In contrast to the method known in the state of the art, in the steps 116 to 120 it is not necessary anymore to access the input buffer of the external storage device for receiving input image data until all data in the cache have been used, as due to the ordering of the lookup table 83 entries the input image data are accessed in the order, as they are stored in the input buffer 81, and thus in the internal storage device/cache. Step 112, i.e. accessing the input buffer of external storage device, is only carried out in case it is decided in step 122 that the processing of the complete image data is finalized, or in case in step 118 it is analyzed that the end of the block, stored in the cache, is reached, and the following block has to be read out from the external storage device. After calculating the respective output image pixel data, the same are stored in the output buffer in step 120. In step 122, it is decided, whether the complete input image is processed. If this is not the case, the method returns to step 116, and the next output image pixel is calculated/remapped. In case in step 122 it is decided that the input image has been processed completely, the method returns to step 108 and awaits that another input image it captured.

The general concept of accessing the input buffer/cache when using the inventive method is shown in FIG. 6. In comparison to FIG. 4, where the accessing is shown only for generating one output image pixel, in FIG. 6 the accessing for four output image pixels is shown. As can be seen in FIG. 6, by means of a rearranged lookup table 83 the data stored in the input buffer 81 that are a least partly stored in the internal storage device/cache, are accessed in the order of their storage in the respective memory. After having processed/calculated the respective output image pixel, the output buffer 85 is accessed to store the respective pixel. As can be seen in FIG. 6, the output buffer is, however, not accessed in a sequential order. In more details, the cells 87*a* to 87*d*, sequentially ordered in the input buffer 81, are accessed to remap the data stored therein and to store the remapped data in cell 89 of the output buffer 85. After this, the following cells 91*a* to 91*d* forming a cell group or cell block in the input buffer 81 are accessed to remap data to generate the data to be stored in cell 93 of the output buffer. The same is applied to the following cells 95*a* to 95*d*, in order to generate the data of the output image to be stored in cell 97 of the output buffer. The method proceeds then by reading data stored in cells 98a to 98d that are directly following cell 95d in the input buffer 81 and storing remapped data in cell 99 of the output buffer 85. The non-sequential access of the output buffer, in the example shown in FIG. 6 the access of cells 89, 93, 97, 99, however does not lead to a significant time delay, each data cell within the output buffer 85 is only accessed one time during the calculation of the respective output image pixel. However during this calculation process the input buffer 81 is accessed a plurality of times, so that any time delay in accessing the input buffer/cache 81 leads to a more significant time delay when compared to accessing the not cached output buffer. Due to the reduced reading time in the internal storage device/input buffer/cache the inventive results might also be achieved by addressing cell groups/cell blocks sequentially to each other. That means that cells within a cell group might be addressed non-sequentially as long as no cell within another cell group is addressed. The cell group might be formed by the cells of the external RAM stored in the input buffer/cache whereas cells of following cell groups are cells in the external RAM loaded subsequently into the input buffer/cache.

As long as the input buffer 81 is accessed for example four times more often than the output buffer 85, the overall number processor stalls is significantly reduced.

The entries of lookup table can be rearranged by a plurality of algorithms. For example an algorithm referred to as "Bubble Sort Algorithm" might be used:

```
1. swapped = "true"
2. while swapped == "true" do
    2.1. swapped = "false"
    2.2. for all n from 0 to N-2 do
        2.2.1. if LUT[n].InAddr > LUT[n+1].InAddr do
            2.2.1.1.  Swap LUT[n] and LUT[n+1]
            2.2.1.2.  swapped = "true"
        2.2.2. end
    2.3. end
3. end
```

Here, function "Swap LUT[n] and LUT[n+1]" places n-th element in the list instead of n+1-th and vice versa.

However, one skilled in the art could employ other sorting algorithms, which require smaller computational effort, for example "Quick Sort Algorithm", without departure from the scope of the present invention.

In order to increase the processing speed, the lookup table 83 is rearranged before the actual image processing starts.

The lookup table 83 can be built and rearranged externally with respect to the image processing device 14, for example on a separate computer.

During the real time image processing phase (steps 108-122 in FIG. 5) the pixels of the input buffer might be repositioned/remapped by using the following algorithm.

1. For every entry n of the lookup table, where n runs from 0 to N−1 do
  1.1. InAddr=LUT[n]. InAddr
  1.2. $C_H$=LUT[n].$C_H$
  1.3. $P_1$=I[InAddr]+CH*(I[InAddr+1]−I[InAddr])
  1.4. $P_2$=I[InAddr+Width]+CH*(I[InAddr+Width+1]−I[InAddr+Width])
  1.5. $C_V$=LUT[n].$C_V$
  1.6. O[LUT[n].OutAddr]=$P_1$+CV*($P_2$−$P_1$)
2. end With the help of FIGS. 7 to 9 an example for an remapping function for removing distortion effects is given.

Figure 7:
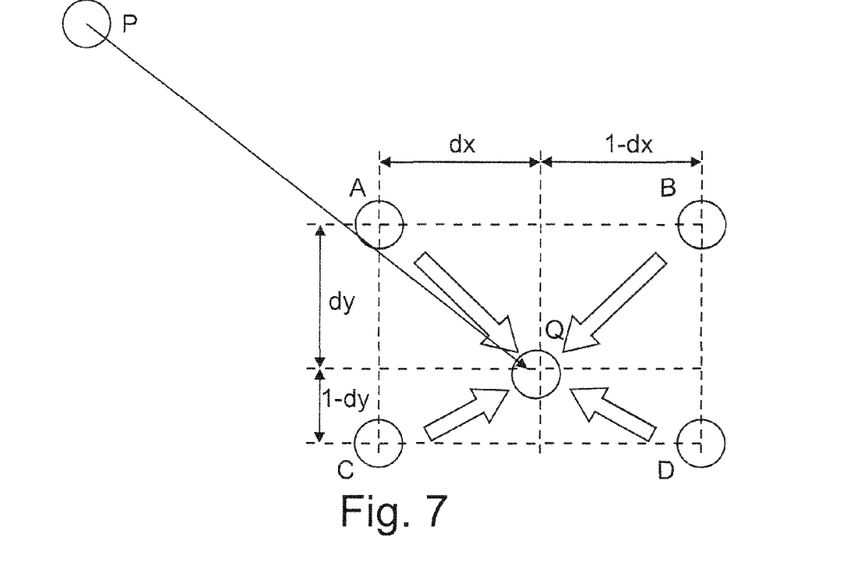
FIG. 7 is a schematic view to the explain a bilinear interpolation.

In FIG. 7, it is shown how a distorted pixel Q can be transferred into an undistorted pixel P by interpolating characteristic values of pixels A-D neighboring the distorted pixel Q.

It is assumed that pixels A to D and P lay on a regular structure (image or monitor pixels). Then, pixel P can be regarded as an undistorted pixel, where pixel Q is its distorted counterpart. Furthermore, pixel P is always located on a regular structure, while pixel Q is in general not part of the raster.

In FIG. 7 the influence of the pixels A to D on the pixel Q depending on the position of Q is realized.

A bilinear interpolation allows calculating an averaged value for a grey-value $V_Q$ of Q according to:

$$V_Q = (dx*dy*((V_D-V_C)-(V_B-V_A)))+(dx*(V_B-V_A))+(dy*(V_C-V_A)+V_A). \quad \text{[formula 1]}$$

$V_A$, $V_B$, $V_C$, $V_D$ represent the grey values of the appropriate pixels A to D; and dx, dy represent the distance between respective pixels in the imaging/monitor plane.

Figure 8:
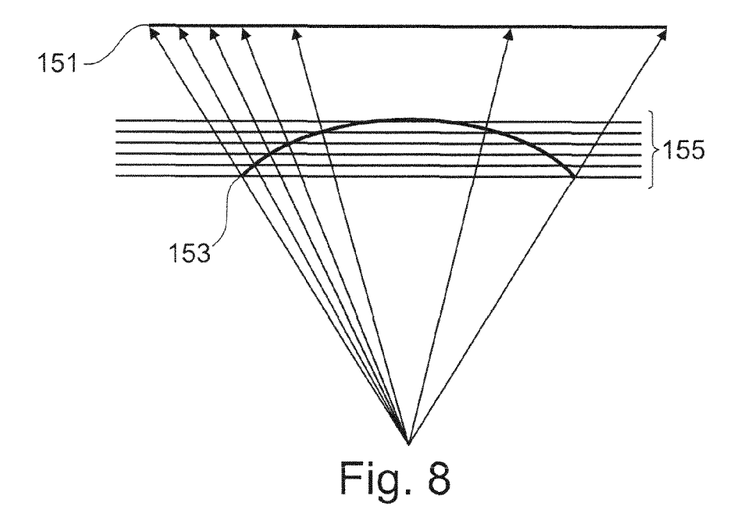
FIG. 8 is a schematic view to visualize a process of an undistortion.

As FIG. 8 shows, an undistorted line 151 of an output image can be reproduced from a distorted line 153, which itself is composed of several image-lines 155 in an input image.

The contribution of each image line is calculated by the above mentioned formula 1.

It is possible that for reconstruction of a single undistorted line more than 3 image lines are required.

Figure 9:
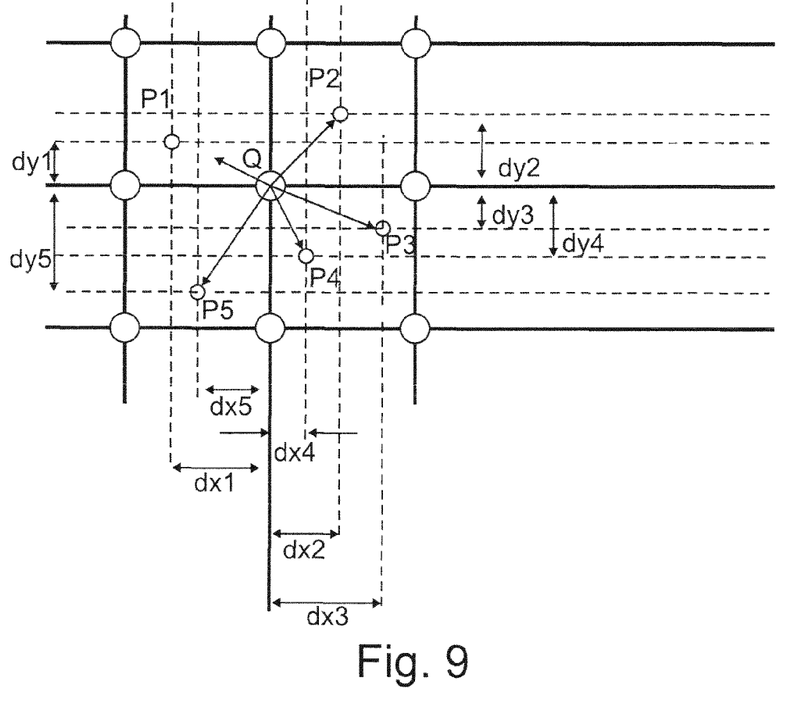
FIG. 9 visualize a bilinear transformation for an undistortion function.

For each (distorted) pixel P1 . . . P5 in FIG. 9 the relation to point Q must be determined:

P1 - - - Q Q is like point D in FIG. 7:
P2 - - - Q Q is like point C in FIG. 7:
P3 - - - Q Q is like point A in FIG. 7:
P4 - - - Q Q is like point A in FIG. 7:
P5 - - - Q Q is like point B in FIG. 7:

The formula 1 can be rewritten and sorted by terms of $V_A$, $V_B$ . . . in the following way:

$$V_Q = dx*dy*V_D - dx*dy*V_C - dx*dy*V_B + dx*dy*V_A + dx*V_B - dx*V_A + dy*V_C - dy*V_A + V_A V_Q = V_A*(1-dy-dx+dx*d) + V_B*(dx-dx*dy) + V_C*(dy-dx*dy) + V_D (dx*dy) V_Q = V_A*(1+(dx*dy)-dx-dy) + V_B*(dx-dx*dy)) + V_C*(dy-dx*dy)) + V_D*(dxdy) \quad \text{[formula 2]}$$

For each distorted pixel (P1 . . . P5 in the example) the contribution of the point Q can be calculated by using the appropriate summand.

That means that for each image-(raster)-pixel the contribution to a distorted pixel can be calculated and stored in a lookup table together with the coordinates of the appropriate undistorted pixel.

An example of an algorithm to build the table might be:
1. For each image pixel (xu,yu) calculate its distorted coordinates (xd,yd).
2. For each calculated distortion coordinate (xd, yd) determine he coordinates of neighbor-points (A, B, C, D)
3. In each neighbor (A . . . D) insert an information (xu, yu) and one of the summands [(1+(dx*dy)−dx−dy), ((dx−(dx*dy))), (dy−(dx*dy)), (dx*dy)] with appropriate dx, dy values.

When processing an image having 640×480 pixels the lookup table might have a size of 640×480×6 bytes as each pixel (xu, yu) occupies 4 byte and each summand occupies 16 bits=2 byte.

The claimed method and device allows a real time image transformation, such as distortion correction or "Bird View". The transformation relies on a lookup table rearranged in such a way, that the elements of an input buffer are accessed in a pixel order. This provides inter alias an advantage by reducing processing time when using cache for temporal storage of a part of the input image.

The features disclosed in the above description, the enclosed claims and the enclosed figures might be relevant for the claimed subject-matter in its different embodiments separately or in any combination.

REFERENCE LIST 1 input image
3 camera
5 output image
7 display
9 image processing device
11 output image pixel
13 input image pixel
14 image processing device
15 image processing unit
17 external RAM device
19 internal RAM device
21 ROM device
23 read operation
25 write operation
27 read operation
29 write operation
31 read operation
33 write operation
51 input buffer
53 lookup table
55 output buffer
57, 59, 61, 63, 65, 67-69, 71 cell
73 block
75 block
77 block
81 input buffer
83 lock-up table
85 output buffer
87a, 87b, 87c, 87d cell
89 cell
91a, 91b, 91c, 91d cell
93 cell
95a, 95b, 95c, 95d cell
97 cell
98a, 98b, 98c, 98d cell
99 cell
100-122 step
151 undistorted line
153 distorted line
155 image lines
A, B, C, D, P, Q pixel

The invention claimed is:

1. A method for processing input image data by an image processing device, to achieve a desired visual effect within an output image, wherein input image data are stored within an input memory device comprising at least one input buffer and being at least partly located within an external storage device, the external storage device being located at least one of externally to or physically separated from an image processing unit of the image processing device and the input image data are transferred based on data of a lookup table into respective output image data stored within an output memory device, wherein the lookup table is generated as a list having a plurality of entries, each comprising for a respective pixel at least one position value, the input memory address field representing a memory address in the input memory device and/or the input buffer, at least one horizontal interpolation coefficient and at least one vertical interpolation coefficient is provided, and to generate the lookup table for each pixel of the input image the position value is calculated based on a row position and a column position of the pixel in the input image by adding to the column position the product of the row position multiplied with the number of columns of the input image wherein when reading data out of a respective cell of the input buffer a restricted block of data is copied into and/or cached in an internal storage device, wherein read/write operations of the image processing unit are performed faster with the internal storage device than with the external storage device, the lookup table being generated based on at least one data remapping function to achieve the desired visual effect, and wherein the entries are arranged within the lookup table in such a way that when processing the lookup table by reading the table entry-by-entry the input memory device is addressed in a sequential reading order, such that the entries of the lookup table are sorted in one of an ascending and a descending order of an input memory address field identifying a memory address in the input buffer thereby accessing input image data in the order as they are stored in the input buffer and in the internal storage device.

2. The method according to claim 1, wherein the entries within the lookup table are arranged before the transfer of the input image data into the output image data.

3. The method according to claim 1, wherein a desired visual effect is a correction of lens distortion effect and/or the generating of a bird view is/are achieved.

4. The method according to claim 1, wherein the output memory comprises at least one output buffer for storing the output image data.

5. The method according to claim 1, wherein a respective value of the input memory address field, the horizontal interpolation coefficient and the vertical interpolation coefficient is calculated based on the data remapping function describing a transformation of pixel coordinates that perform the visual effect.

6. The method according to claim 1, wherein to generate the lookup table for each pixel of the input image at least one transformation value is calculated based on the data remapping function, such as at least one first transformation value based on a first data remapping function and at least one second transformation value based on a second data remapping function, wherein the respective value of the input memory address field is calculated by adding to a floor value of the first transformation value the product of a floor value of the second transformation value multiplied with the number of columns of the input image, the horizontal interpolation coefficient is calculated by subtracting from the first transformation value the floor value of the first transformation value, and/or the vertical interpolation coefficient is calculated by subtracting from the second transformation value the floor value of the second transformation value.

7. The method according to claim 1, wherein after generating the lookup table and/or before the transfer of the input image data into the output image data the entries within the lookup table are rearranged based on a sort function.

8. The method according to claim 7, wherein the sort function comprises at least one bubble sort function, at least one quick sort function, at least one merge sort function, at least one insertion sort function, at least one tree sort function, at least one comb sort function, at least one gnome sort function, at least one heap sort function, at least one intro sort function, at least one selection sort function, at least one shaker sort function, at least one shell sort function, at least one smooth sort function, at least one stooge sort function, at least one swap sort function, at least one bucket sort function, at least one counting sort function and/or at least one radix sort function.

9. The method according to claim 1, wherein the input image data are stored in the input memory device and/or the output image data are stored in the output memory device in a pixel order.

10. The method according to claim 9, wherein data of adjacent pixels in a row of the input image are stored in adjacent cells of the input memory device and data of a pixel at an end of a row of the input image are stored in a cell of the input memory device followed by a cell in which the data of a pixel of a following row of the input image are stored.

11. The method according to claim 9, wherein data of adjacent pixels in a row of the output image are stored in adjacent cells of the output memory device and data of a pixel at an end of a row of the output image are stored in a cell of the output memory device followed by a cell in which the data of a pixel of a following row of the output image are stored.

12. The method according to claim 1, wherein the entries in the lookup table are processed in a sequential processing order for the transfer of the data and when following this sequential processing order the input memory device, is/are addressed in a sequential reading order.

13. The method according to claim 12, wherein the cells of the input memory device is/are addressed in a sequential reading order.

14. A method for processing input image data by an image processing device, to achieve a desired visual effect within an output image, wherein input image data are stored within an input memory device comprising at least one input buffer and being at least partly located within an external storage device, the external storage device being located at least one of externally to or physically separated from an image processing unit of the image processing device and the input image data are transferred based on data of a lookup table into respective output image data stored within an output memory device, wherein when reading data out of a respective cell of the input buffer a restricted block of data is copied into and/or cached in an internal storage device, wherein read/write operations of the image processing unit are performed faster with the internal storage device than with the external storage device, the lookup table being generated based on at least one data remapping function to achieve the desired visual effect, and wherein the entries are arranged within the lookup table in such a way that when processing the lookup table by reading the table entry-by-entry the input memory device is addressed in a sequential reading order, such that the entries of the lookup table are sorted in one of an ascending and a descending order of an input memory address field identifying a memory address in the input buffer thereby accessing input image data in the order as they are stored in the input buffer and in the internal storage device, and wherein the transfer of the data comprises reading a first entry in the lookup table comprising information on the pixel to be read out of the input memory device, a first memory address in the input memory device, and a second memory address in the output memory device, and wherein the position value is used as an output memory address field, at least indirectly addressing a respective cell, identified by the first input memory, address in the input memory device, reading the input image data stored in said cell of the input memory device, addressing a respective cell identified by the second memory address, in the output memory device and storing said read input image data based on the data stored in the lookup table in said cell in the output memory device.

15. The method according to claim 1, wherein the output buffer is at least partly located within the external storage device, and/or the external storage device comprises a random-access memory.

16. The method according to claim 1, wherein when reading data out of a respective cell of the output buffer of the external storage device the data is copied into and/or cached in the internal storage device, data read out of the input buffer and/or the output buffer of the external storage device are copied and/or cached in an input buffer and/or output buffer of the internal device, and/or the internal storage device comprises a random-access memory and/or is located internally of the image processing unit.

17. The method according to claim 16, wherein data stored in neighboring cells of the respective cells are also copied into/cached as a block in the internal storage device.

18. The method according to claim 1, wherein a stall of the image processing unit is avoided or reduced when read/write operations of the image processing unit are performed with the internal storage device.

19. The method according to claim 15, wherein first the internal storage device is accessed to read the input image data for the transfer and in case the required data are not available/are not cached in the internal storage device, the external storage device is accessed to read the data for the transfer.

20. The method according to claim 1, wherein the lookup table is generated by the image processing unit or is generated by a processing unit being separated from the image processing unit.

21. The method according to claim 1, wherein the lookup table is stored within a read-only memory connected to the image processing unit, the look up table also storing program code information executed by the image processing unit for processing the input image data.

22. The method according to claim 1, wherein the data remapping function comprises a bilinear interpolation.

23. A computer readable, non-transitory medium having stored thereon a program code to carry out the method according to claim 1.

24. An image processing device for carrying out the method according to claim 1, comprising at least one image processing unit, at least one input memory device in which data of at least one input image are storable and at least one output memory device in which data of at least one output image are storable.

25. The image processing device according to claim 24, wherein the device comprises at least one image sensor, wherein the data provided by the image sensor are input into and/or stored in the input memory device.

* * * * *